(12) United States Patent
Ortega

(10) Patent No.: US 12,506,520 B2
(45) Date of Patent: Dec. 23, 2025

(54) METHOD FOR ROBUST HYBRID PRECODING IN MASSIVE MIMO SYSTEMS AND NON-TRANSITORY COMPUTER READABLE STORAGE MEDIUM

(71) Applicant: SAMSUNG ELETRÔNICA DA AMAZÔNIA LTDA., Amazônia (BR)

(72) Inventor: Alvaro Javier Ortega, Manaus (BR)

(73) Assignee: SAMSUNG ELETRÔNICA DA AMAZÔNIA LTDA., Manaus (BR)

( * ) Notice: Subject to any disclaimer, the term of this patent is extended or adjusted under 35 U.S.C. 154(b) by 203 days.

(21) Appl. No.: 18/218,701

(22) Filed: Jul. 6, 2023

(65) Prior Publication Data

US 2024/0380444 A1     Nov. 14, 2024

(30) Foreign Application Priority Data

May 12, 2023   (BR) ...................... 10 2023 009164 4

(51) Int. Cl.
*H04B 1/04*     (2006.01)
*H04B 7/0452*   (2017.01)
(Continued)

(52) U.S. Cl.
CPC ......... *H04B 7/0452* (2013.01); *H04B 1/0475* (2013.01); *H04B 7/046* (2013.01); *H04L 25/0204* (2013.01)

(58) Field of Classification Search
None
See application file for complete search history.

(56) References Cited

U.S. PATENT DOCUMENTS 8,204,142 B2   6/2012   Hwang et al.
9,755,810 B2   9/2017   Gaal et al.
(Continued)

OTHER PUBLICATIONS

Wang et al., "Joint Optimization of the Worst-Case Robust MMSE MIMO Transceiver", IEEE Signal Processing Letters, vol. 18, No. 5, pp. 295-298, May 2011.
(Continued)

*Primary Examiner* — Suhail Khan
(74) *Attorney, Agent, or Firm* — STAAS & HALSEY LLP

(57) ABSTRACT

The present invention describes a method, system, and a non-transitory computer readable storage medium to mitigate the side effects of imperfect channel estimation, analog processing imperfections, beamforming misalignment, and other imperfections present in massive MIMO wireless communications systems. Through the present invention, the user will have a better communication experience regarding data rate transmission, spectrum efficiency, and, specially, communication reliability. The core of the present invention relies on how the imperfections present in massive MIMO systems are modeled and faced by adding more robustness to the proposed baseband precoder. In addition, the present invention has the capacity to be implemented in any hybrid hardware architecture, where the number of radiofrequency (RF) chains is lower than the number of antennas. This feature is crucial for massive MIMO devices because having an expensive and energy-intensive RF chain per antenna would be impractical or even prohibit when the number of antennas is large.

11 Claims, 5 Drawing Sheets
(5 of 5 Drawing Sheet(s) Filed in Color)

(51) Int. Cl.
   *H04B 7/0456*     (2017.01)
   *H04L 25/02*      (2006.01)

(56) References Cited

U.S. PATENT DOCUMENTS 10,164,691 B2    12/2018  Verbin et al.
2016/0301499 A1*  10/2016  Shin ..................... H04L 1/0643

OTHER PUBLICATIONS

Palhares et al., "*Robust MMSE Precoding and Power Allocation for Cell-Free Massive MIMO Systems*", IEEE Transactions on Vehicular Technology, vol. 70, No. 5, pp. 5115-5120, May 2021.

\* cited by examiner

METHOD FOR ROBUST HYBRID PRECODING IN MASSIVE MIMO SYSTEMS AND NON-TRANSITORY COMPUTER READABLE STORAGE MEDIUM

CROSS-REFERENCE TO RELATED APPLICATION(S)

This application is based on and claims priority under 35 U.S.C. § 119 to Brazilian Patent Application No. BR 10 2023 009164 4, filed on May 12, 2023, in the Brazilian Intellectual Property Office, the disclosure of which is incorporated by reference herein in its entirety.

FIELD OF THE DISCLOSURE

The present invention is related to the signal processing applied in massive MIMO wireless communication systems. It describes a signal processing method for robust hybrid precoding in massive MIMO systems and a non-transitory computer readable storage medium. The described method can be applied in any hybrid precoder in such a manner that decreases the side effects caused by the system imperfections, including, but not limited to, imperfect channel estimation, misaligned beamforming, the noise of the analog components, the limited resolution of phase shifter if any, non-ideal beamforming, etc.

DESCRIPTION OF RELATED ART

The challenge of wireless communications relies on the manner to face the undesired effect of the time-variant channel. For example, the path loss, temporal obstructions between transmitter and receiver; in some cases, even rain, water vapor, atmospheric gases can result in severe link quality degradation, etc. All these phenomena make wireless communications are unviable without a proper signal processing. Consequently, to have a reliable communication, a signal processing technique is performed in the transmitter to mitigate the undesired effects caused by the channel conditions. This signal processing procedure is known as channel precoding or precoding. Furthermore, when the wireless communications scenario has multiple users, e.g., wireless communications mobile networks, a proper precoding technique can reduce both the undesired channel effects and the inter-user interference. Thus, a transmitter with a suitable precoding technique can transmit multiple data streams to multiple users per time.

Most existing and effective precoding techniques need to estimate the channel state information (CSI). For time-division duplex (TDD) systems, the CSI estimation procedure can be performed at the transmitter side because the uplink and downlink share the same frequency band. For frequency-division duplex (FDD) systems, however, the CSI needs to be estimated at the receiver and feedback to the transmitter. At any of these scenarios, the CSI estimation procedure grows as the number of antennas is larger. This problem raises a balance between communication reliability and spectrum efficiency. On the one hand, the channel estimation accuracy increases as the number of the pilot signals is larger, enhancing the communication reliability as the channel estimation is more accurate. On the other hand, the dedicated bandwidth for the user data decreases as the number of pilot or reference signals is larger, decreasing the spectrum efficiency.

Massive MIMO is the oncoming wireless communication technology that will bring a tremendous increment of throughput and communication reliability thanks to the diversity gain caused by the large number of antennas. However, getting an accurate CSI estimation for this kind of technology will have serious repercussions in the user data bandwidth, and consequently, the expected throughput will be deeply degraded. For example, in the next millimeter-wave (mmWave) systems, the wireless communication devices could have hundreds of antennas elements due to (i) the wavelength is given in millimeters, which makes possible that large antenna arrays can occupy a small area, and (ii) a large number of antennas is required to deal with the adverse channel conditions at mmWave frequencies. Therefore, high accurate channel estimation procedures are prohibited on such a large number of antenna elements to not negatively affect spectrum efficiency. Consequently, it is indispensable to add more robustness to the precoding procedure such that the side effects caused by the imperfect channel estimation are mitigated. A precoder robust against noisy CSI is highly desired for all wireless communication systems, but more specially for such that operate with Massive MIMO.

The signal processing for communications systems must deal with several noise types; the imperfect CSI estimation is just one of them, which is more critical for Massive MIMO systems as stated before. Other types of noise come from the imperfections of the device's hardware, the thermal noise, the asynchronism in the sampling procedure, the imperfect orthogonality in the OFDM modulation or OFDMA, misaligned beamforming, and so on. All these imperfections produce a performance degradation of the system; and finding a solution to mitigate their side effects is a research topic that has been born since the beginning of the communication systems and is still under development.

There are several methods to mitigate the side effects of the different noise sources present in wireless communications systems. However, most of them use high complex computational solutions that makes them prohibitive in massive MIMO scenarios. In addition, many of these methods are characterized by their limited robustness, e.g., a method could be just robust against noisy CSI but no more than that. On the other hand, no hybrid architectures have been taken in this sense, i.e., no robust hybrid precoders or robust beamforming have been proposed so far. Therefore, the prior art methods cannot be applied in massive MIMO due to the hardware constraints.

The U.S. Provisional Patent Application No. 61/811,633 by Gaal et al, entitled PRECODER RESOURCE BUNDLING INFORMATION FOR INTERFERENCE CANCELLATION IN LTE disclosers a method, system, and device for interference cancellation/interference suppression (IC/IS) of neighboring cell transmissions. A user equipment (UE) may receive a downlink transmission from a base station and also receive interfering signals from one or more neighboring base stations. A UE may be configured to perform IC/IS operations on interfering signals. To improve IC/IS operations, the UE may evaluate whether resource bundling is used for interfering signals. The UE may modify IC/IS operations for one or more subframes in response to the evaluation. Modifying the IC/IS operations may include, for example, using information related to bundling at the neighboring base station(s) to cancel interfering signals from the base station(s).

The U.S. patent application Ser. No. 15/208,198 by Rami Verbin et al, entitled HYRBRID PRECODER describes a method that employs linear precoding and non-linear precoding for transmitting data between at least two transmitters and a plurality of receivers via a plurality of communication channels over a plurality of subcarrier frequencies. The method comprises the procedures of transmitting by either one of said at least two transmitters, at least two training signals to respective said receivers; receiving by respective said receivers, said at least two training signals; evaluating channel characteristics of at least part of said communication channels, according to said at least two training signals; determining a precoding scheme selection that defines for at least part of said communication channels, over which of said subcarrier frequencies, said data transmitted shall be precoded using either one of linear precoding and non-linear precoding, according to evaluated said channel characteristics; precoding said data according to determined said precoding scheme selection; and transmitting said data according said precoding scheme selection.

The U.S. patent application Ser. No. 12/021,488 by In-Soo Hwang et al, entitled PRECODER AND PRECODING METHOD IN MULT-ANTENNA SYSTEM disclosers a precoder and a precoding method for multiuser multi-antenna systems. The precoder includes a channel checker to determine the downlink channel condition of terminals in a service coverage area, a pre-compensator to pre-compensate the channel distortions, signals to be sent to the terminals when a nonlinear algorithm is selected based on the channel condition of the terminals, and an interference remover to mitigate the channel and inter-terminals interference. Accordingly, the pre-equalization can be carried out without global channel state information, and an increment of the transmit power can be prevented in the permutation stage.

The paper "*Joint Optimization of the Worst-Case Robust MISE MIMO Transceiver*", by J. Wang and M. Bengtsson (in IEEE Signal Processing Letters, vol. 18, no. 5, pp. 295-298, May 2011, doi: 10.1109/LSP.2011.2123092), considers a robust MIMO transceiver design to minimize mean square errors by taking into account the imperfect CSI from a worst-case robustness perspective. The authors show that for a given precoder, the optimal robust equalizer is obtained through a channel diagonalization operation, and vice versa. Thus, a joint but usually suboptimal transceiver design can be readily obtained by alternately optimizing the equalizer and precoder, where in each iteration only a scalar problem is solved. Furthermore, they propose efficient algorithms for scalar optimization problems. The paper "*Robust MMSE Precoding and Power Allocation for Cell-Free Massive MBO Systems*", by V. M. T. Palhares, A. R. Flores and R. C. de Lamare (in IEEE Transactions on Vehicular Technology, vol. 70, no. 5, pp. 5115-5120, May 2021, doi: 10.1109/TVT.2021.3072828), considers the downlink of a cell-free massive MIMO system with single-antenna access points (APs) and single-antenna users. An iterative robust minimum mean-square error (RMMSE) precoder based on generalized loading is developed to mitigate the interference in the presence of imperfect CSI. An achievable rate analysis is carried out and optimal and uniform power allocation schemes are developed based on the signal-to-interference-plus-noise ratio. Furthermore, an analysis of the computational costs of the proposed RMMSE and existing schemes is also presented. Since, the authors are concerned only with mitigating the undesired effects caused by the imperfect CSI, their proposed "Robust MMSE Precoding" is just robust against the presence of imperfect channel estimation. However, from a signal processing point of view, the imperfections in wireless communication systems can come from different sources.

SUMMARY OF THE INVENTION

The present invention describes a method for robust hybrid precoding in massive MIMO systems that comprises a digital signal processing preferably executed in the baseband or digital domain. Throughout the present document, it will be detailed how the imperfections present in massive MIMO systems are modeled and how the present invention faces those imperfections, adding more robustness to the proposed baseband precoder. In addition, the present invention has the capacity to be implemented in hybrid hardware architectures, i.e., it can be used in any hardware, where the number of radiofrequency (RF) chains is lower than the number of antennas. This feature is crucial for massive MIMO devices because having an expensive and energy-intensive RF chain per antenna would be impractical or even prohibit when the number of antennas is large.

Some of the positive effects of the present invention include the mitigation of the side effects of noisy CSI, noisy phase shifters, and other imperfections present in massive MIMO systems. This mitigation is reached at the cost of a slight computational complexity increment, but without any additional hardware. In the present document will be shown some exhaustive simulations, where the numerical results of the present invention evidence a bit error rate (BER) gain of about 9 dB in some scenarios. These findings infer that through the present invention, the user will have a better communication experience regarding data rate transmission, spectrum efficiency, and, specially, communication reliability.

The present invention is also related to a non-transitory computer readable storage medium adapted for performing the method for robust hybrid precoding in MIMO systems.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention is explained in greater detail below and makes references to the drawings and figures, attached herewith, when necessary. The figures used for explanations purposes are.

DETAILED DESCRIPTION OF THE INVENTION

The present invention describes a method for robust hybrid precoding in massive MIMO systems and a non-transitory computer readable storage medium. The major utility of the present invention is its capability to mitigate the side effects of imperfect channel estimation, analog processing imperfections, beamforming misalignment, and other imperfections present in massive MIMO wireless communications systems.

The core of the present invention relies on adding more robustness to the proposed baseband precoder. The robust feature of the present invention refers to its capacity to mitigate the undesired side effects caused by several imperfections that are present in massive MIMO systems, e.g., the imperfect CSI, misaligned beamforming, the noise of the analog components, the limited resolution of phase shifter if any, non-ideal beamforming, etc. Furthermore, the robustness of the present invention can be expanded to mitigate more imperfections in a straightway fashion thanks to the proposed methodology.

In addition, the present invention has the capacity to be implemented in hybrid hardware architectures, where the number of radiofrequency (RF) chains is lower than the number of antennas. This feature is crucial for massive MIMO devices because having an expensive and energy-intensive RF chain per antenna would be impractical or even prohibit when the number of antennas is large. Fully digital techniques require a dedicated expensive, and energy-intensive RF chain for each antenna, which is impractical or even prohibit when the number of antennas is large. In contrast, hybrid alternatives offer a balance between hardware complexity and system performance, substituting some RF chains by chipper and high-energy efficient analog components. Thus, the proposed robust hybrid MMSE is a potential candidate to be applied in massive MIMO transmitters, offering a low manufacturing cost and a low power consumption.

Considerations

The following notation is used throughout the document: C denotes the field of complex numbers; $\mathcal{A}$ is a set; A is a matrix; a is a vector; a is a scalar; $A_{a,b}, A_{a,:}, A_{:,b}$, denote the (a, b)-th entry, a-th row, and b-th column of the matrix A, respectively; $I_N$ is the N×N identity matrix; tr{A} returns the trace of matrix A;

|A| computes the determinant of A; $\|.\|_p$ is the p-norm, for the Euclidean norm case, p=2, the under-index is avoided; $(.)^T$ and $(.)^H$ denote the transpose and conjugate transpose, respectively; $\mathbb{E}[.]$ is the expectation operator; $\mathcal{CN}(a, A)$ denotes a circularly symmetric complex Gaussian random vector with mean a and covariance matrix A; and B=blkdiag($A_1, \ldots, A_N$) returns the block diagonal matrix created by aligning the input matrices $A_1, \ldots, A_N$ along the diagonal of B.

Figure 1:
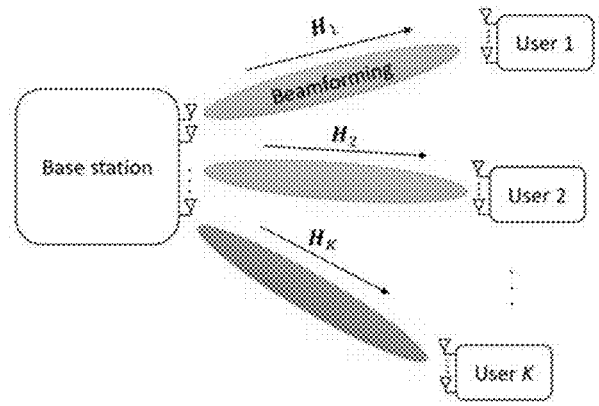
FIG. 1 shows a schema of a downlink transmission for multi-users using massive MIMO according to an embodiment of the present invention.

The downlink of the considered massive MIMO system is illustrated in FIG. 1, where there is a base station equipped with multiple antennas, which is transmitting to K multi-antenna users. The channel variation from the base station to the user k is represented by $H_k$. In FIG. 1, it can be observed that the base station produces several beamforming, where each beamforming is addressed to the user placement. This fact suggest that spatial division multiple access (SDMA) is inherent in the present invention. Furthermore, the multiple-antenna users are merely illustrative, because they can also represent a particular area, where multiple users or devices can be served by convening other access techniques, e.g., orthogonal frequency division multiple access (OFDMA), time division multiple access (TDMA), etc. However, to explain only the present invention and no other topics of signal processing, the multiple-antenna users will be treated as they are throughout this document. In addition, the terms base station and transmitter will be interchangeable, which brings the idea that any MIMO wireless device can use the present invention.

To decrease the power consumption and manufacturing cost of the terminals, we consider hybrid processing to be performed both in the transmitters and receivers. The present invention does not consider any hardware architecture for the hybrid processing. Therefore, it can be applied broadly to all types of hybrids precoders or combiners.

Figure 2:
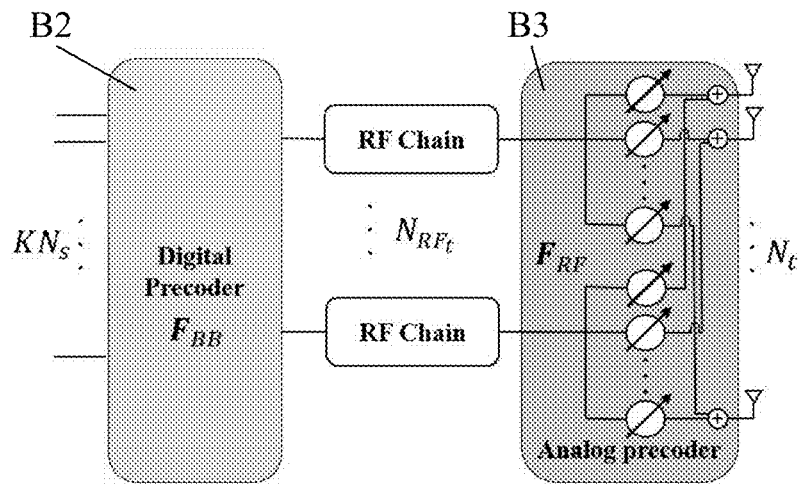
FIG. 2 shows a hybrid precoder implemented by a well-known fully connected architecture based on phase shifters and signal adders.

FIG. 2 illustrates a well-known hybrid precoder architecture, which, without generality loss, will be used hereafter to explain the present invention. Note that the number of RF chains, $N_{RF_t}$, is lower than the number of antennas, $N_t$, so that it is necessary to have a method to connect these components. This connection method refers to the hardware architecture of the analog components that substitute some RF chains, which, into the literature, is named as analog precoder or beamforming. In FIG. 2, the hybrid precoder uses a fully connected architecture, where each antenna transmits the sum of the signals that come from all RF chains and whose phases have been modified by the phase shifters. In addition, note that the hybrid precoder process $KN_s$ signals, which will be transmitted to K users so that each user will receive $N_s$ data streams.

Figure 3:
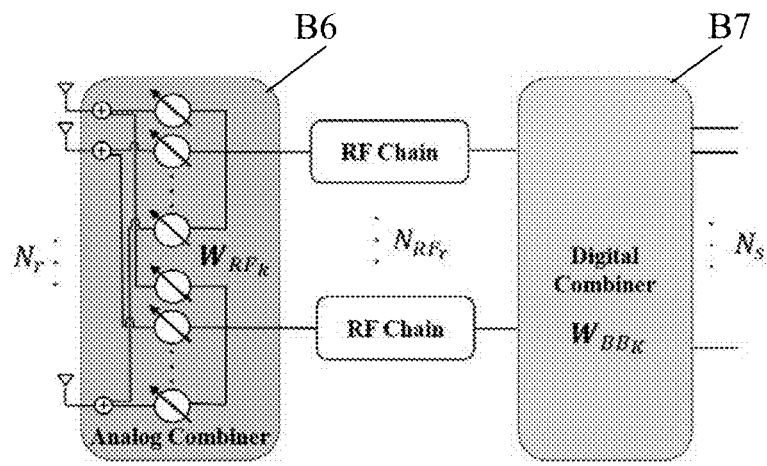
FIG. 3 shows a hybrid combiner implemented by a well-known fully connected architecture based on phase shifters and signal adders.

FIG. 3 illustrates the hybrid combiner that could be used in the receivers. Similar to the hybrid precoder shown in FIG. 2, the hybrid combiner is executed in two stages. In the first stage, there is the analog combiner that performs analog changes over the passband signals, while in the second stage, the digital combiner refines the signals through a digital signal processing, which modifies the phase and amplitude of the baseband signals, aiming to better performance.

The proposed and existing precoding adaptive techniques are all performed knowing the channel state information (CSI). The assumption that full CSI is available at the transmit side is valid in time-division duplex (TDD) systems because the uplink and downlink share the same frequency band. For frequency-division duplex (FDD) systems, however, the CSI needs to be estimated at the receiver and feedback to the transmitter. The method exposed by the present invention consider that the CSI has been reached by one of the many channel estimation algorithms that already exist in the literature, e.g., making use of periodical transmissions of pilot symbols or reference signals. Once the base station knows the user channels, the proposed hybrid precoder is performed. The present invention uses massive MIMO wireless devices so that to not degrade the spectral efficiency and for practical implementation of the proposed method, the present invention considers that the transmitter has a noisy CSI and proposes a solution to mitigate its side effects.

Figure 4:
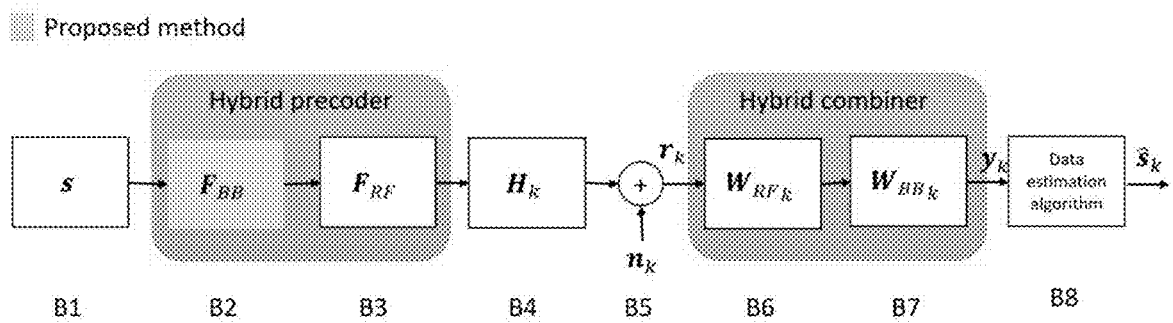
FIG. 4 shows a simplified block diagram of the downlink transmission for the user k using hybrid processing, according to an embodiment of the present invention, with around an area of the present invention.

FIG. 4 presents a diagram block of the simplified signal processing for a downlink transmission for the user k using hybrid processing. The functioning of each one of the blocks is detailed below.

In FIG. 4, Block B1 represents the information to be transmitted to all users. The data stream vector s is a concatenation of the data streams of the K users so that $s=[s_1, s_2, \ldots, s_K]^T$, where $s_k \in \mathbb{C}^{N_s \times 1}$ represents the data stream vector of the user k, whose components belong to a symbols' constellation, e.g., QPSK, 16-QAM, etc.

Blocks B2 and B3 aim to mitigate the undesired effects of the channel and to separate accurately the data stream among the users, reducing the inter-user interference. These two blocks together form the hybrid precoder (see FIG. 2).

Block B2 performs the method of the present invention, which executes the digital part of the hybrid precoder or baseband beamformer, i.e., the method to be run in the baseband processing, therefore, it performs a digital signal processing, where changes in amplitude and phase of the signals are available. These changes are specified by the matrix $F_{BB}$, and they can be performed by an FPGA or other components capable of manipulate signals. For explanation purposes, let's consider that the transmitter is equipped with a FPGA. The entries values of the matrix $F_{BB}$ tells the FPGA how much it must change the signal in both phase and amplitude. Since the present invention considers hybrid processing, the FPGA just must manipulate $N_{RF}$ signals rather than $N_t$, where the value of $N_{RF}$, the number of RF chains, can be great lower than $N_t$, the number of antennas for transmission.

Once the signals have been modified by the digital part of the hybrid precoder, they pass through the RF chains as specified in FIG. 2. This process performs several changes to the signals, e.g., it transforms the baseband signals into passband signals, converters the digital signals into analog signals, amplifies the resulting signal, and more. Then, another precoding process is performed, but this time only changes in phase are available due to it is a passband processing. These phase changes are performed generally by phase shifters as illustrated in FIG. 2; however, different analog components can be used, e.g., switches and phase inverters. The analog beamformer or analog part of the hybrid precoder represented as $F_{RF}$, or by Block B3 in FIG. 4, tells the phase shifters how much they must shift the phase of the signals to obtain an optimal performance.

Still regarding FIG. 4, Block B4 represents the attenuations that experience the signals once they are transmitted. The channel matrix $H_k$, which is also known as channel gain matrix, represents the channel from the BS to the user k.

Block B5 represents the thermal noise in the receiver, which is usually taken as an additive white Gaussian noise.

Blocks B6 and B7 denote the hybrid combiner performed by the user k (see FIG. 3). The hybrid combiner has the function of combining the $N_r$ received signals to obtain the $N_s$ data streams. In a similar manner to the hybrid precoder represented by the Blocks B2 and B3, the Block B6 represents the analog combiner that specifies the analog changes that must be executed in the passband domain, while the Block B7 represents the digital combiner that must be performed in the digital domain.

Once the receiver gets the $N_s$ combined signals, a data estimation method is executed. This data estimation method is represented by Block B8. There are many method options for data detection, one of the most popular is by minimum distance detection, which rounds $r_k$ to its closest symbol vector from the used constellation, e.g., QPSK, 64QAM, etc.

System Model

Consider a base station (BS) or transmitter equipped with $N_t$ antennas and $N_{RF_t}$ RF chains that is transmitting to K users or terminals. Each user has $N_r$ antennas and $N_{RF_r}$ RF chains to process $N_s$ data streams. The hybrid precoder, $F \in \mathbb{C}^{N_t \times KN_s}$, is obtained by the product between the RF beamformer, $$F_{RF} \in \mathbb{C}^{N_t \times N_{RF_t}},$$

and the baseband beamformer, $$F_{BB} \in \mathbb{C}^{N_{RF_t} \times KN_s}.$$

The BS sends $KN_s$ data streams simultaneously using $N_{RF_t}$ RF chains, where $N_{RF_t}$ satisfies $KN_s \leq N_{RF_t} \leq N_t$.

The received vector by the user k is given by $$y_k = \sqrt{p_f} \hat{H}_k F_{RF} F_{BB} s + n_k \qquad (1)$$

where $p_f$ is a normalization variable to satisfy the total energy available $E_T$ at the BS for transmission such that $\| \sqrt{p_f} F_{RF} F_{BB} s \|^2 = E_T$, $\hat{H}_k$ denotes the estimated channel matrix from the BS to the user k; $n_k \in \mathbb{C}^{N_r \times 1}$ represents the additive white Gaussian noise vector that follows $\mathcal{CN}(0, C_n)$, where $C_n = \sigma_n^2 I_{N_r}$ is the noise covariance matrix, $s = [s_1, s_2, \ldots, s_K]^T$ is the concatenation of the users' symbols, whose entries belong to a constellation Q, and satisfies $\mathbb{E}[ss^H] = I_{KN_s}$.

The receiver uses its $N_R F_r$ RF chains and analog components to obtain the processed received signal $$r_k = \sqrt{p_f} W_k^H \hat{H}_k F_{RF} F_{BB} s + W_k^H n_k \qquad (2)$$

where $W_k = W_{RF_k} W_{BB_k}$ is the hybrid combiner or equalizer of the user k, $$W_{RF_k} \in \mathbb{C}^{N_r \times N_{RF_r}}$$

the analog combining matrix and $$W_{BB_k} \in \mathbb{C}^{N_{RF_r} \times N_s}$$

denotes the baseband combining matrix of the user k. The hardware architecture of the hybrid combiner can be anyone, allowing that the present invention has no constraints in this matter for its application. For explanation purposes, let's consider the well-known hybrid combiner architecture illustrated in FIG. 3.

The received and equalized signals by the K users are stacked in the vector $r \in \mathbb{C}^{KN_s \times 1}$ as follows $$r = \sqrt{p_f} W^H \hat{H} F_{RF} F_{BB} s + W^H n \qquad (3)$$

where $\hat{H} = [\hat{H}_1^T \hat{H}_2^T \ldots \hat{H}_K^T]^T \in \mathbb{C}^{KN_r \times N_t}$ denotes the stacked estimated channel matrix of all users; and $W = \text{blkdiag}(W_1, W_2, \ldots, W_K)$.

Channel Estimation Error

The imperfect CSI can be straightforward modeled by a Gauss-Markov formulation, where the imperfect channel estimate $\hat{H}_k$ of the user k is obtained using its true channel $H_k$ as follows $$\hat{H}_k = \tau H_k + \sqrt{1-\tau^2} E_k \qquad (4)$$

where $E_k$ represents the noise of the channel estimation that is weighted by the factor $\sqrt{1-\tau^2}$. The scalar parameter $\tau \in [0, 1]$ is used to indicate the quality of the channel estimation, where $\tau=1$ corresponds to perfect channel estimation whereas $\tau=0$ corresponds to only random or pure noisy channel estimate $E_k$.

Substituting the equation (4) in equation (3) allows to rewrite the stacked vector of the users' received signals as $$r = \sqrt{p_f} W^H G F_{RF} F_{BB} s + \sqrt{p_f} W^H \tilde{G} F_{RF} F_{BB} s + W^H n \qquad (5)$$

Proposed Invention

The present invention solves the following optimization problem $$\{F_{BB}^*, \beta^*\} = \text{argmin}_{F_{BB}, \beta} \mathbb{E}[\|s - \beta r\|^2] + tr\{M F_{RF} F_{BB} F_{BB}^H F_{RF}^H\} \qquad (6)$$

$$\text{s.t. } \|\sqrt{p_f} F_{RF} F_{BB} s\|^2 = E_T$$

The solution of the above problem will return $F_{BB}^*$ that represents the optimum low-dimensional baseband precoder filter and $\beta^*$, which is the optimum scalar that should be used in the receivers to assist the data detection procedure.

The regularization factor contains the auxiliary matrix M, which is a matrix composed of all imperfections of the systems whose side effects want to be mitigated.

The present invention defines this auxiliary matrix as $M = \sum_{i=1}^{N} \Gamma_i \mathbb{E}[\tilde{G}_i \tilde{G}_i^H]$, where $\Gamma_i$ represents the weight of the system's imperfection i and satisfies $\sum_{i=1}^{N} \Gamma_i = 1$. The behavior of the value of $\Gamma_i$ is as $\Gamma_i$ takes a larger value, the hybrid precoder will have more robustness against the imperfection i. The factor $\mathbb{E}[\tilde{G}_i \tilde{G}_i^H]$ represents the covariance matrix of the side effects produced by the imperfection i.

The classical MMSE filter that represents the optimal solution to equation (6) when the regularization factor is dropped, i.e., M=0, such solution is defined below $$F_{BB_0} = \frac{\beta_0^{-1}}{\sqrt{p_{f_0}}} \left( F_{RF}^H \hat{H}^H W W^H \hat{H} F_{RF} + \frac{tr\{K_n\}}{E_T} F_{RF}^H F_{RF} \right)^{-1} F_{RF}^H \hat{H}^H W \qquad (7)$$

$$\beta_0 = \qquad (8)$$

$$\sqrt{\frac{1}{E_T} tr\left\{ F_{RF} \left( F_{RF}^H \hat{H}^H W W^H \hat{H} F_{RF} + \frac{tr\{K_n\}}{E_T} F_{RF}^H F_{RF} \right)^{-1} F_{RF}^H \hat{H}^H W W^H \right.}$$

$$\left. \hat{H} F_{RF} \left( F_{RF}^H \hat{H}^H W W^H \hat{H} F_{RF} + \frac{tr\{K_n\}}{E_T} F_{RF}^H F_{RF} \right)^{-1} F_{RF}^H \right\}$$

where $p_{f_0}$ is the normalization factor to satisfy $\|\sqrt{p_{f_0}} F_{RF} F_{BB_0} s\|^2 = E_T$ and $K_n = W^H C_n W$.

The solution for the problem in equation (6) is as follows $$F_{BB_{RMMSE}} = \frac{\beta_{RMMSE}^{-1}}{\sqrt{p_f}} \qquad (9)$$

$$\left( F_{RF}^H \hat{H}^H W W^H \hat{H} F_{RF} + \frac{\beta_0^{-2}}{p_{f_0}} \tilde{M} + \frac{tr\{K_n\} - \beta_0^{-2} tr\{\tilde{M} F_{BB_0} F_{BB_0}^H\}}{E_T} F_{RF}^H F_{RF} \right)^{-1}$$

$$F_{RF}^H \hat{H}^H W$$

$$\beta_{RMMSE} = \sqrt{\frac{1}{E_T} tr\left\{ F_{RF} \left( F_{RF}^H \hat{H}^H W W^H \hat{H} F_{RF} + \right.\right.} \qquad (10)$$

$$\left.\left. \frac{\beta_0^{-2}}{p_{f_0}} \tilde{M} + \frac{tr\{K_n\} - \beta_0^{-2} tr\{\tilde{M} F_{BB_0} F_{BB_0}^H\}}{E_T} F_{RF}^H F_{RF} \right) F_{RF}^H \hat{H}^H W^{-1} \right\}$$

where $\tilde{M} = F_{RF}^H M F_{RF}$. Then, $F_{BB_0}$, $p_{f_0}$, and $\beta_0$ are obtained by computing the classical MMSE filter, i.e., using equations (7) and (8) or using equations (9) and (10) with M=0.

Thus, the equation (9) can be interpreted as a refinement over the MMSE filter that aims to mitigate the side effects caused by presence of imperfect CSI and the other imperfections into M. This refinement depends on the values of $\Gamma_i$, i=1, 2, . . . , N, such that a method to find their proper values is required.

We propose to perform brute force over some possible values of $\Gamma_i$ and select the one that maximizes the sum-rate of the system, i.e., to perform the following operation:

$$\Gamma^* = \text{argmax}_{\Gamma \in \mathcal{T}} R\{F_{BB_{RMMSE}}\{\Gamma\}\} \qquad (11)$$

where $\Gamma$ represents a vector que contains all weights $\Gamma_i$, i=1, 2, . . . , N, i.e., $\Gamma = [\Gamma_1, \ldots, \Gamma_N]$.

The set $\mathcal{T}$ is composed of all possible values of $\Gamma$, and $R\{F_{BB_{RMMSE}}\{\Gamma\}\}$ denotes the sum-rate value obtained when $F_{BB_{RMMSE}}$ uses a given value of $\Gamma$. The sum-rate of the system can be computed as follows $$R = \sum_{k=1}^{K} \log_2 |I_{N_s} + W_k^H H_k F_k F_k^H H_k^H W_k K_k^{-1}| \qquad (12)$$

where $F_k$ represents the hybrid precoder part that corresponds to the user k, i.e., separate the matrix F into submatrices so that the hybrid precoder can be written as $F=[F_1 F_2 \ldots F_K]$; and $K_k = W_k^H C_n W_k$.

As stated before, the matrix $$M = \sum_{i=1}^{N} \Gamma_i \mathbb{E}[\tilde{G}_i \tilde{G}_i^H]$$

is composed of all imperfections of the systems whose side effects want to be mitigated. Below we will explain how to add robustness again imperfect or noisy CSI and noisy analog components. However, more robustness types can be added by following the same methodology, i.e., considering the factor $\mathbb{E}[\tilde{G}_i\tilde{G}_i^H]$, as the covariance matrix of the side effects produced by the imperfection i that want to be mitigated. Note that the terms $\mathbb{E}[\tilde{G}_i\tilde{G}_i^H]$, i=1, ..., N, are fixed. Therefore, they need to be computed once and stored in the database of the transmitter.

To add robustness against noisy CSI, we define $\tilde{G}_1 = \tilde{G} = \sqrt{1-\tau^2}E$, see equation (5). Therefore, $\mathbb{E}[\tilde{G}_i\tilde{G}_i^H]=(1-\tau^2)EE^H$. Considering, without loss of generality, that the entries of E follows a probability distribution function CN(0, 1), then the covariance of $\tilde{G}_1$ can be reduced to $\mathbb{E}[\tilde{G}_i\tilde{G}_i^H]=(1-\tau^2)I_{N_t}$. Consequently, $M=\tilde{G}_1=\Gamma_1(1-\tau^2)I_{N_t}$.

There are several hardware architectures for hybrid precoders, which can use different analog components for beamforming. For illustration purposes, we consider the most popular hybrid precoder architecture, which connects each RF chain to all antennas through phase shifters and signal adders as illustrated in FIG. 2.

For this architecture, we consider the noise caused by the phase shifters that affects the accuracy of the beamforming and degrades system's performance.

This phase shift imperfection can be modeled as follows: $\tilde{\theta}=\theta+\alpha$, where $\theta$ represents the true desired phase shift, $\alpha$ is the undesired phase deviation, and $\tilde{\theta}$ is the executed phase shift. Then, $\tilde{G}_2$ is modulated as $\tilde{G}_2=F(\theta)-F(\tilde{\theta})$, where $F(\theta)$ represents the hybrid precoder or beamforming obtained by using ideal phase shifters, whereas $F(\tilde{\theta})$ is the one obtained by noisy phase shifters. Thus $\tilde{G}_2$ can be interpreted as the beamforming error caused by the imperfection of the noisy phase shifters.

Therefore, $\mathbb{E}[\tilde{G}_i\tilde{G}_i^H]$ can be computed straightforward numerically and stored in the database of the transmitter. Thus, adding this robustness to the previous result yields $M=\Gamma_1(1-\tau^2)I_{N_t}+\Gamma_2(F(\theta)-F(\tilde{\theta}))$.

Hardware Implementation

The exemplificative embodiments described herein may be implemented using hardware, software or any combination thereof and may be implemented in one or more computer systems or other processing systems. Additionally, one or more of the steps described in the example embodiments herein may be implemented, at least in part, by machines. Examples of machines that may be useful to perform the one or more steps of the method include general purpose digital computers, specially programmed computers, desktop computers, server computers, client computers, laptop computers, mobile communication devices, tablets, and/or similar devices.

For instance, one illustrative example system for performing the operations of the embodiments herein may include one or more components, such as one or more microprocessors, for performing the arithmetic and/or logical operations required for program execution, and storage media, such as one or more disk drives or memory cards (e.g., flash memory) for program and data storage, and a random-access memory, for temporary data and program instruction storage.

Therefore, the present invention is also related to a system for detecting food intake comprising a processor, and a memory comprising computer readable instructions that, when performed by the processor, causes the processor to perform the method steps previously described in this disclosure.

The system may also include software resident on a storage media (e.g., a disk drive or memory card), which, when executed, directs the microprocessor(s) in performing transmission and reception functions. The software may run on an operating system stored on the storage media, such as, for example, UNIX or Windows, Linux, Android, and the like, and can adhere to various protocols such as the Ethernet, ATM, TCP/IP protocols and/or other connection or connectionless protocols.

As is well known in the art, microprocessors can run different operating systems, and can contain different types of software, each type being devoted to a different function, such as handling and managing data/information from a particular source or transforming data/information from one format into another format. The embodiments described herein are not to be construed as being limited for use with any particular type of server computer, and that any other suitable type of device for facilitating the exchange and storage of information may be employed instead.

Software embodiments of the illustrative example embodiments presented herein may be provided as a computer program product, or software, that may include an article of manufacture on a machine-accessible or non-transitory computer-readable medium (also referred to as "machine-readable medium") having instructions. The instructions on the machine accessible or machine-readable medium may be used to program a computer system or other electronic device. The machine-readable medium may include, but is not limited to, floppy diskettes, optical disks, CD-ROMs, and magneto-optical disks or other type of media/machine readable medium suitable for storing or transmitting electronic instructions.

Therefore, the present invention also relates to a non-transitory computer readable storage medium for detecting food intake from wearable devices, comprising computer readable instructions that, when performed by the processor, causes the processor to perform the method steps previously described in this disclosure.

The techniques described herein are not limited to any particular software configuration. They may be applicable in any computing or processing environment. The terms "machine-accessible medium", "machine-readable medium" and "computer-readable medium" used herein shall include any non-transitory medium that is capable of storing, encoding, or transmitting a sequence of instructions for execution by the machine (e.g., a CPU or other type of processing device) and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

Results

In the simulations, the channels are generated by considering that the antenna array of the base station and terminals are arranged as a uniform planar array with square format.

The total energy available at the BS, $E_T$, is equal to K. The signal-to-noise ratio (SNR) is taken from the transmission; therefore, it is defined as $$SNR = \frac{E_T}{\sigma_n^2}.$$

For the proposed method, the set $\mathcal{T}$ is taken as $\mathcal{T} = \{[0.1, 0.9], [0.2, 0.8], \ldots, [0.9, 0.1]\}$.

Figure 5:
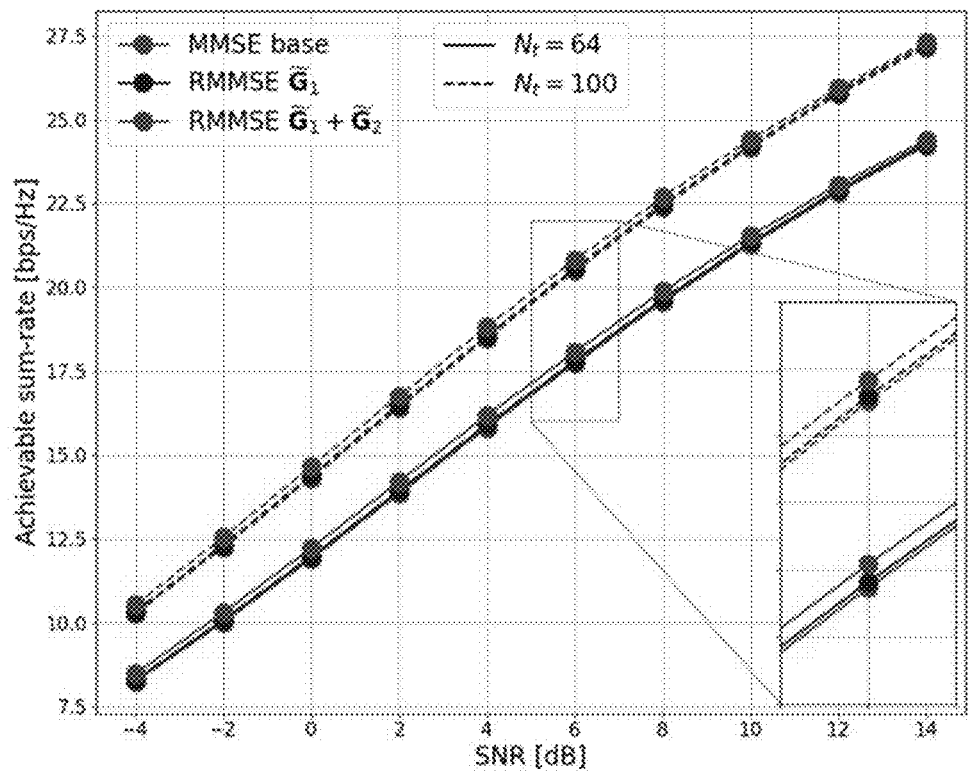
FIG. 5 shows a sum-rate comparison, where the BS has $N_t=64$ ($N_t=100$) antennas and transmits to K=2 users equipped with $N_r=4$ antennas, and the channel estimation error is obtained with τ=0.9 according to an embodiment of the present invention.

FIG. 5 presents a sum-rate comparison between two mmWave scenarios. The first considers a base station with $N_t=64$ antennas, transmitting to K=2 users equipped with $N_r=4$ antennas, and a channel estimation error of $\tau=0.9$. The second one only differs from the previous scenario on the number of transmitting antennas by considering a higher value, $N_t=100$.

FIG. 5 show a performance improvement that grows as more imperfections are taken into account. The MMSE Base stands for the MMSE precoder that does not operate the proposed method, i.e., the auxiliary matrix M is null. In contrast, RMMSE $\tilde{G}_1$ set the proposed method to mitigate the side effects of the noisy CSI, operating $M=\tilde{G}_1$, while RMMSE $\tilde{G}_1+\tilde{G}_2$ considers both the imperfections that come from noisy CSI and the noisy phase shifters, taking $M=\tilde{G}_1+\tilde{G}_2$.

Figure 6:
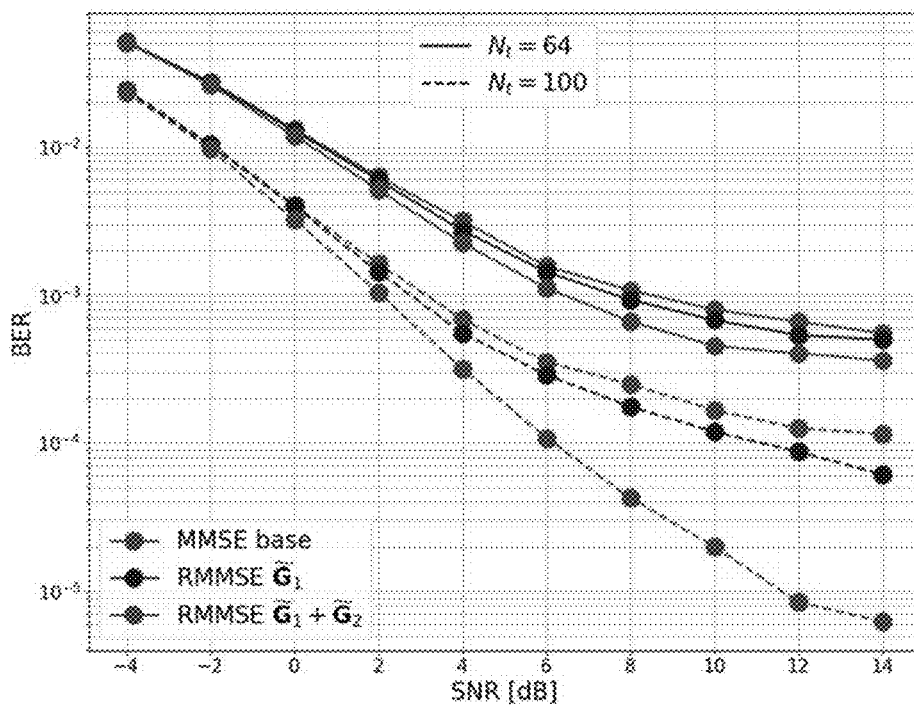
FIG. 6 shows a BER comparison, where the BS has $N_t=64$ ($N_t=100$) antennas and transmits to K=2 users equipped with $N_r=4$ antennas, and the channel estimation error is obtained with τ=0.9 according to an embodiment of the present invention.

FIG. 6 retakes the mmWave scenarios considered in the previous figure, FIG. 5, to compare them in terms of BER. It is observed a great improvement through the proposed method, reaching a gain of about 9 dB when the two imperfections are considered, i.e., noisy CSI and noisy phase shifters.

Figure 7:
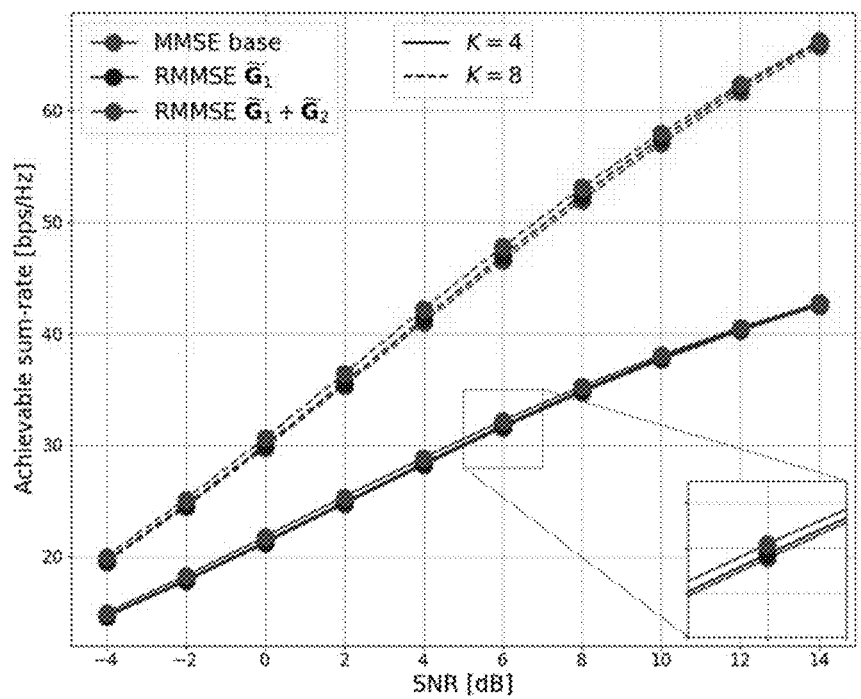
FIG. 7 shows sum-rate comparison, where the BS has $N_t=100$ antennas and transmits to K=4 (K=8) users equipped with $N_r=4$ antennas, and the channel estimation error is obtained with $\tau=0.9$ according to an embodiment of the present invention.
Figure 8:
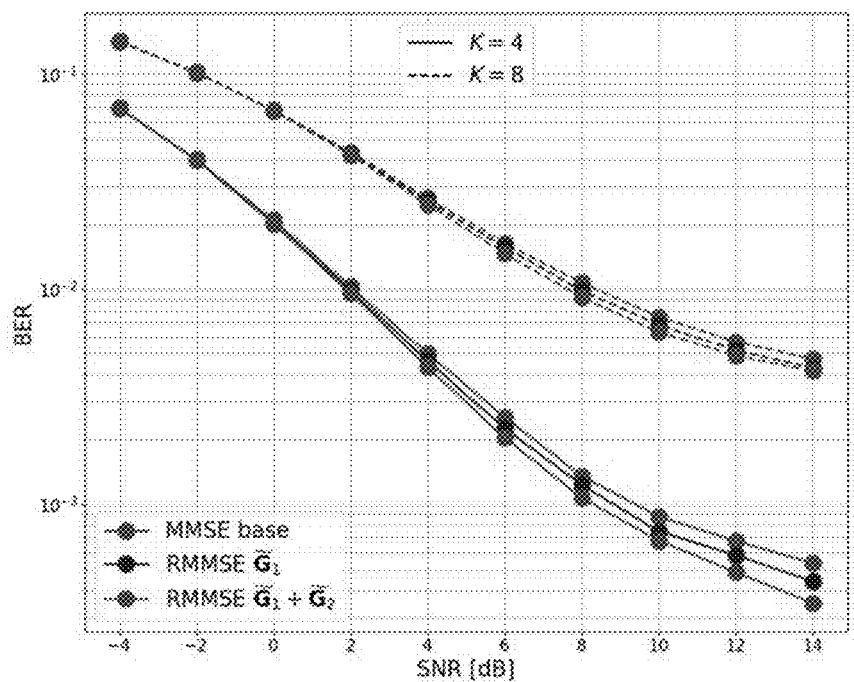
FIG. 8 shows a BER comparison, where the BS has $N_t=100$ antennas and transmits to K=4 (K=8) users equipped with $N_r=4$ antennas, and the channel estimation error is obtained with $\tau=0.9$ according to an embodiment of the present invention.

FIGS. 7 and 8 present a performance comparison in terms of sum-rate and BER, respectively. The simulated scenarios consider a base station equipped with $N_t=100$ antennas, transmitting to K=4 (K=8) users, each one with $N_r=4$ receiving antennas. Furthermore, the channel estimation error follows $\tau=0.9$.

FIG. 7 shows a very similar behavior from such presented in FIG. 5, and it is noted that the hierarchical order is held regardless of the variation in the number of users. On the other hand, FIG. 8 evidences a more significant gain from the proposed method as the number of users is lower.

Figure 9:
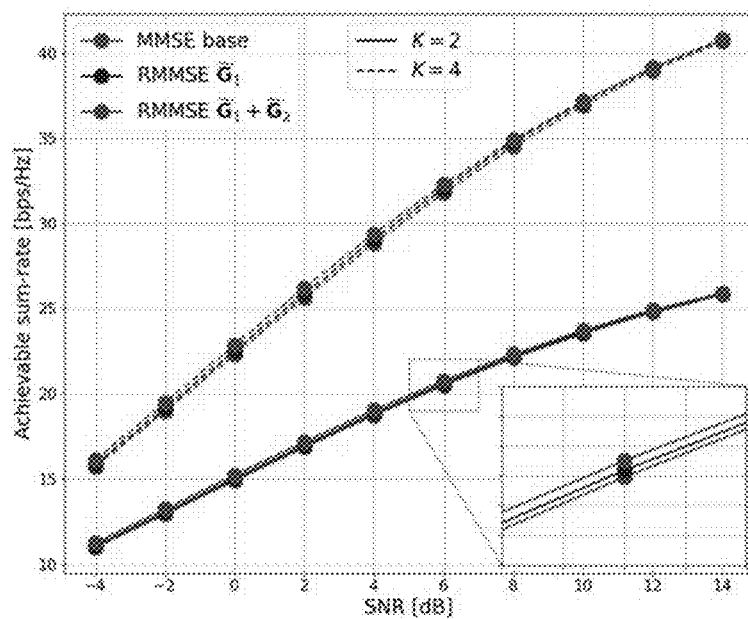
FIG. 9 shows a sum-rate comparison, where the BS has $N_t=144$ antennas and transmits to K=2 (K=4) users equipped with $N_r=4$ antennas, and the channel estimation error is obtained with $\tau=0.8$ according to an embodiment of the present invention.
Figure 10:
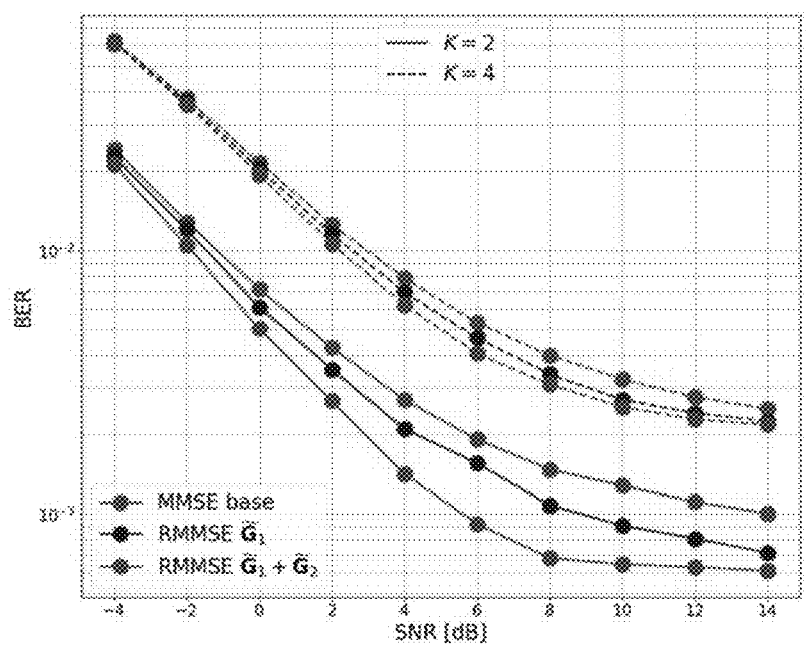
FIG. 10 shows a BER comparison, where the BS has $N_t=144$ antennas and transmits to K=2 (K=4) users equipped with $N_r=4$ antennas, and the channel estimation error is obtained with $\tau=0.8$ according to an embodiment of the present invention.

FIGS. 9 and 10 present a performance comparison in terms of sum-rate and BER, respectively. The simulated scenarios consider a more challenging noise conditions, where the channel estimation error is obtained with $\tau=0.8$. The considered base station has $N_t=144$ antennas and transmits to K=2 (K=4) users with $N_r=4$ receiving antennas.

Although more noise is present in the simulated systems, FIG. 9 shows the hierarchical order of the previous results, highlighting that the proposed method continues to reach the best results. FIG. 10 stresses the significant advantages that can be achieved using the proposed method in scenarios with a low number of users, a behavior that was observed in FIG. 6 as well. The BER gain offered by the proposed method is about 8.5 dB. In fact, the target of the proposed method through equation (6) is to decrease the BER by facilitating the estimation procedure in the receivers. Consequently, the major advantages that must be expected from the proposed method are in the BER performance.

Advantages of the Invention

The present invention mitigates the side effects of imperfect channel estimation, analog processing imperfections, beamforming misalignment, and other imperfections present in massive MIMO wireless communications systems. The existing methods for these ends are addressed to low dimensional MIMO. Therefore, they cannot be applied in massive MIMO due to hardware constraints. In addition, many of these methods have high computational complexity, making them prohibitive in massive MIMO scenarios. In addition, the existing techniques usually are robust against a few imperfections, e.g., a method could be just robust against noisy CSI but no more than that.

What is claimed is:

1. A method of robust hybrid precoding in massive multiple-input multiple-output (MIMO) systems, the massive MIMO system comprising:
   at least one hybrid precoder including:
      at least a digital precoder,
      a plurality of radio frequency (RF) Chains,
      an analog precoder, and
      a plurality of transmission antennas, a number of the plurality of RF Chains being lower than a number of the plurality of transmission antennas; and
   at least one hybrid combiner performed by users, the at least one hybrid combiner including:
      at least a plurality of receiver antennas,
      an analog combiner,
      a plurality of RF chains and a digital combiner,
   the method including a digital signal processing to be performed in a baseband domain by the digital precoder to solve an optimization problem as follows:

$$\{F_{BB}^*, \beta^*\} = \mathrm{argmin}_{F_{BB},\beta} \mathbb{E}\big[\|s - \beta r\|^2\big] + tr\big\{MF_{RF}F_{BB}F_{BB}^H F_{RF}^H\big\}$$

$$\text{s.t. } \big\|\sqrt{p_f}\, F_{RF}F_{BB}s\big\|^2 = E_T,$$

wherein $F_{BB}^*$ represents an optimum low-dimensional baseband precoder filter, entries values of $F_{BB}^*$ represents how much a signal in both phase and amplitude must change;
$\beta^*$ represents an optimum scalar used in a receiver to enhance a data detection procedure;
$s=[s_1, s_2, \ldots, s_K]^T$ is concatenation of users' symbols, having entries that belong to a symbol constellation, and satisfies $\mathbb{E}[ss^H]=I_{KN_s}$;
$F_{RF}$ is the analog precoder or beamforming or beamformer, r is a staked vector that contains all received and equalized signals by the K users;
$E_T$ represents a total power for transmission; and
M is an auxiliary matrix comprising imperfections of systems with side effects to be mitigated.

2. The method according to claim 1, wherein the auxiliary matrix M comprises all imperfections of systems with side effects to be mitigated and is defined as follows:

$$M = \sum_{i=1}^{N} \Gamma_i \mathbb{E}[\widetilde{G}_i \widetilde{G}_i^H]$$

wherein $\Gamma_i$ represents a weight of system's imperfection i and satisfies $\Sigma_{i=1}^N \Gamma_i=1$; and a factor $\mathbb{E}[\widetilde{G}_i \widetilde{G}_i^H]$ represents a covariance matrix of the side effects produced by an imperfection i.

3. The method according to claim 2, wherein when a value of $\Gamma_i$ takes a larger value, the method of robust hybrid precoding has more robustness against the imperfection i.

4. The method according to claim 1, further includes a solution for the optimization problem as follows:

$$F_{BB_{RMMSE}} = \frac{\beta_{RMMSE}^{-1}}{\sqrt{p_f}}$$

$$\left(F_{RF}^H \hat{H}^H WW^H \hat{H} F_{RF} + \frac{\beta_0^{-2}}{p_{f_0}} \tilde{M} + \frac{tr\{K_n\} - \beta_0^{-2} tr\{\tilde{M} F_{BB_0} F_{BB_0}^H\}}{E_T} F_{RF}^H F_{RF}\right)^{-1}$$

$$F_{RF}^H \hat{H}^H W$$

$$\beta_{RMMSE} = \sqrt{\frac{1}{E_T} tr}$$

$$\left\{F_{RF}\left(F_{RF}^H \hat{H}^H WW^H \hat{H} F_{RF} + \frac{\beta_0^{-2}}{p_{f_0}} \tilde{M} + \frac{tr\{K_n\} - \beta_0^{-2} tr\{\tilde{M} F_{BB_0} F_{BB_0}^H\}}{E_T} F_{RF}^H F_{RF}\right)\right.$$

$$F_{RF}^H \hat{H}^H W^{-1}$$

wherein $\hat{H} = [\hat{H}_1^T \; \hat{H}_2^T \; \hat{H}_K^T]^T \in \mathbb{C}^{KN_r \times N_t}$ denotes a stacked estimated channel matrix of all users; W=blkdiag($W_1$, $W_2$, ..., $W_K$); $W_k = W_{RF_k} W_{BB_k}$ is the at least one hybrid combiner or an equalizer of a user k, $$W_{RF_k} \in \mathbb{C}^{N_r \times N_{RF_r}}$$

is an analog combining matrix and $$W_{BB_k} \in \mathbb{C}^{N_{RF_r} \times N_s}$$

denotes a baseband combining matrix of a user k; and $K_n = W^H C_n W$; $C_n$ is a covariance matrix of a noise in receivers.

5. The method according to claim 4, wherein $F_{BB_0}$ and $\beta_0$ are computed as follows:

$$F_{BB_0} = \frac{\beta_0^{-1}}{\sqrt{p_{f_0}}}\left(F_{RF}^H \hat{H}^H WW^H \hat{H} F_{RF} + \frac{tr\{K_n\}}{E_T} F_{RF}^H F_{RF}\right)^{-1} F_{RF}^H \hat{H}^H W$$

$$\beta_0 = \sqrt{\frac{1}{E_T} tr\left\{F_{RF}\left(F_{RF}^H \hat{H}^H WW^H \hat{H} F_{RF} + \frac{tr\{K_n\}}{E_T} F_{RF}^H F_{RF}\right)^{-1} F_{RF}^H\right.}$$

$$\hat{H}^H WW^H \hat{H} F_{RF}\left(F_{RF}^H \hat{H}^H WW^H \hat{H} F_{RF} + \frac{tr\{K_n\}}{E_T} F_{RF}^H F_{RF}\right)^{-1} F_{RF}^H\right\}$$

where $p_{f_0}$ is a normalization factor to satisfy $\|\sqrt{p_{f_0}} F_{RF} F_{BB_0} s\|^2 = E_T$.

6. The method according to claim 1, further comprising: performing brute force over some possible values of $\Gamma_i$ and selecting one that maximizes a sum-rate of a system including an operation as follows:

$$\Gamma^* = \operatorname{argmax}_{\Gamma \in \mathcal{T}} R\{F_{BB_{RMMSE}}\{\Gamma\}\}$$

wherein $\Gamma$ represents a vector que contains all weights $\Gamma_i$, i=1, 2, ..., N, i.e., $\Gamma = [\Gamma_1, ..., \Gamma_N]$; a set $\mathcal{T}$ is composed of all possible values of $\Gamma$; and $R\{F_{BB_{RMMSE}}\{\Gamma\}\}$ denotes the sum-rate value obtained when $F_{BB_{RMMSE}}$ uses a given value of $\Gamma$.

7. The method according to claim 6, wherein the sum-rate of the system is computed as follows:

$$R = \sum_{k=1}^{K} \log_2 |I_{N_s} + W_k^H H_k F_k F_k^H H_k^H W_k K_k^{-1}|$$

wherein $K_k = W_k^H C_n W_k$, $I_{N_s}$ is an identity matrix with size $N_s$, and $N_s$ is a number of data streams that the users receive.

8. The method according to claim 1, wherein robustness is added through modeling of $\tilde{G}_1$ in the auxiliary matrix M, wherein a nosy channel state information (CSI) is modeled as $\hat{H}_k = \tau H_k + \sqrt{1-\tau^2} E_k$, where $H_k$ is a true channel of a user k, $E_k$ is a noise of a channel estimation, and $\tau \in [0,1]$ is used to indicate a quality of the channel estimation, $\tau = 1$ corresponds to perfect channel estimation whereas $\tau = 0$ corresponds to only random or pure noisy channel estimate.

9. The method according to claim 8, wherein, to add robustness against noisy CSI, a covariance of $\tilde{G}_1$ is reduced to $\mathbb{E}[\widetilde{G_1}\widetilde{G_1}^H] = \sqrt{(1-\tau^2)} I_{N_t}$ and consequently the auxiliary matrix M is defined as $M = \tilde{G}_1 = \Gamma_1 \sqrt{(1-\tau^2)} I_{N_t}$, wherein $\tilde{G}_1$ is defined as $\tilde{G}_1 = \tilde{G} = \sqrt{1-\tau^2} E$; $\mathbb{E}[\widetilde{G_1}\widetilde{G_1}^H] = \sqrt{(1-\tau^2)} EE^H$; E follows a probability distribution function $\mathcal{CN}(0, 1)$; and $N_t$ represents a number of transmitting antennas.

10. The method according to claim 8, wherein, to add robustness against phase shifters noise $\tilde{G}_2$ is modulated as $\tilde{G}_2 = F(\theta) - F(\tilde{\theta})$, $\mathbb{E}[\widetilde{G_2}\widetilde{G_2}^H]$ to be computed straightforward numerically and stored in a database of a transmitter, and the auxiliary matrix M is defined as $M = \tilde{G}_1 + \widetilde{G_2} = \Gamma_1 (1-\tau^2) I_{N_t} + \Gamma_2 (F(\theta) - F(\tilde{\theta}))$, wherein $\tilde{\theta} = \theta + \alpha$, where $\theta$ represents a true desired phase shift, $\alpha$ is an undesired phase deviation, and $\tilde{\theta}$ is an executed phase shift; $F(\theta)$ represents the hybrid precoder or beamforming obtained by using ideal phase shifters, whereas $F(\tilde{\theta})$ is the one obtained by noisy phase shifters.

11. A non-transitory computer readable storage medium storing computer readable instructions, when performed by a processor, causes a computer to perform the method as defined in claim 1.

* * * * *